United States Patent
Zhang et al.

(10) Patent No.: US 8,782,805 B2
(45) Date of Patent: *Jul. 15, 2014

(54) METHOD AND SYSTEM FOR DETECTING WHEN AN OUTGOING COMMUNICATION CONTAINS CERTAIN CONTENT

(75) Inventors: Benyu Zhang, Beijing (CN); Hua-Jun Zeng, Beijing (CN); Wei-Ying Ma, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 504 days.

This patent is subject to a terminal disclaimer.

(21) Appl. No.: 12/510,186

(22) Filed: Jul. 27, 2009

(65) Prior Publication Data
US 2009/0313706 A1 Dec. 17, 2009

Related U.S. Application Data

(63) Continuation of application No. 10/881,867, filed on Jun. 30, 2004, now Pat. No. 7,594,277.

(51) Int. Cl.
*H04L 29/06* (2006.01)

(52) U.S. Cl.
USPC .......................................................... 726/30

(58) Field of Classification Search
USPC .................... 726/11, 13, 14, 30, 1
See application file for complete search history.

(56) References Cited

U.S. PATENT DOCUMENTS

| | | | |
|---|---|---|---|
| 4,807,182 A | 2/1989 | Queen | |
| RE35,861 E * | 7/1998 | Queen | 395/772 |
| 6,021,202 A | 2/2000 | Anderson et al. | |
| 6,212,517 B1 * | 4/2001 | Sato et al. | 707/749 |
| 6,393,428 B1 | 5/2002 | Miller et al. | |
| 6,658,626 B1 * | 12/2003 | Aiken | 715/205 |
| 6,826,493 B1 | 11/2004 | Mangalam | |
| 7,594,277 B2 * | 9/2009 | Zhang et al. | 726/30 |
| 2002/0069198 A1 | 6/2002 | Stebbings et al. | |

(Continued)

FOREIGN PATENT DOCUMENTS

| WO | WO-03032107 A2 | 4/2003 |
|---|---|---|
| WO | WO-03-065248 A2 | 8/2003 |

OTHER PUBLICATIONS

Dumais, Susan et al. "Inductive Learning Algorithms and Representations for Text Categorization." Proceedings of the Seventh Int'l Conference on Information and Knowledge Management, p. 148-155, Nov. 2-7, 1998, Bethesda, MD (8 pages).

(Continued)

*Primary Examiner* — Edward Zee
(74) *Attorney, Agent, or Firm* — Carole Boelitz; Leonard Smith; Micky Minhas

(57) ABSTRACT

A method and system for detecting whether an outgoing communication contains confidential information or other target information is provided. The detection system is provided with a collection of documents that contain confidential information, referred to as "confidential documents." When the detection system is provided with an outgoing communication, it compares the content of the outgoing communication to the content of the confidential documents. If the outgoing communication contains confidential information, then the detection system may prevent the outgoing communication from being sent outside the organization. The detection system detects confidential information based on the similarity between the content of an outgoing communication and the content of confidential documents that are known to contain confidential information.

20 Claims, 10 Drawing Sheets

(56) References Cited

U.S. PATENT DOCUMENTS

| | | | |
|---|---|---|---|
| 2002/0199095 A1* | 12/2002 | Bandini et al. | 713/151 |
| 2003/0149687 A1* | 8/2003 | Brown et al. | 707/3 |
| 2004/0003289 A1* | 1/2004 | Bhogal et al. | 713/201 |
| 2004/0054886 A1* | 3/2004 | Dickinson et al. | 713/153 |
| 2006/0020607 A1 | 1/2006 | Patterson | |
| 2006/0095966 A1 | 5/2006 | Park | |
| 2006/0277208 A1 | 12/2006 | Starbuck et al. | |
| 2006/0277210 A1 | 12/2006 | Starbuck | |

OTHER PUBLICATIONS

Joachims, Thorsten. "Text Categorization with Support Vector Machines: Learning with Many Relevant Features." In Tenth European Conference on Machine Learning ECML-98, p. 137-142, 1999 (7 pages).

Stratify Legal Discovery Service, "Overview" (4 pages).

Drucker, Harris et al. "Support Vector Machines for Spam Categorization." IEEE Trans. on Neural Networks, 1999, p. 1048-1054, vol. 10, No. 5 (8 pages).

Mont, Marco Casassa et al., "The HP Time Vault Service: Exploiting IBE for Timed Release of Confidential Information." WWW 2003, May 20-24, 2003, Budapest, Hungary. ACM 1-58113-680-3/03/0005 (16 pages).

Lee et al., "An Email Monitoring System for Detecting Outflow of Confidential Documents," Intelligence and Security Informatics, Springer Berlin Heidelberg, Berlin, Jan. 1, 2003, vol. 2665, pp. 371-374.

European Search Report for App. No. 05105394.0, Applicant: Microsoft Corporation; Mailing Date: Feb. 2, 2012; 4 pages.

* cited by examiner

METHOD AND SYSTEM FOR DETECTING WHEN AN OUTGOING COMMUNICATION CONTAINS CERTAIN CONTENT

CROSS REFERENCE TO RELATED APPLICATION

This application is a continuation application of U.S. patent application Ser. No. 10/881,867, filed on Jun. 30, 2004, and entitled "METHOD AND SYSTEM FOR DETECTING WHEN AN OUTGOING COMMUNICATION CONTAINS CERTAIN CONTENT," which is incorporated herein in its entirety by reference.

TECHNICAL FIELD

The described technology relates generally to detecting when documents have similar content and particularly to detecting when an outgoing communication contains certain content.

BACKGROUND

Many organizations develop confidential, trade secret, proprietary, and other information that is important to the successful operation of each such organization. In many cases, it is very important for an organization to ensure that this information is not disclosed outside the organization. If such information is disclosed outside the organization, the information may become valueless or will result in substantial harm to the organization. For example, a manufacturing company may develop a list of features to be incorporated in the next version of a product. If a competitor is able to ascertain the list of features before the next version is released, then the competitor may be able to use the information to their competitive advantage. As another example, an organization may need to take an internal disciplinary action against an employee who has violated some rule of the organization. If the violation became public, it may present a public relations problem for the organization. To ensure that their confidential information is not improperly disclosed, many organizations implement extensive measures to ensure that no such disclosure occurs. For example, some companies conduct training sessions with their employees to ensure that they understand the importance of maintaining the confidentiality of trade secrets, that the employees know to mark all documentation that contains trade secrets as confidential, and so on.

Although electronic communications have allowed employees of organizations to communicate effectively and productively, electronic communications have also allowed confidential information to be easily and rapidly disseminated outside organizations. For example, if a leader of a design team sends an electronic mail message itemizing the new features of the next version of a product to the members of the team, then any member of the team can forward the message to other employees of the company or even to the employees of a competitor. Such distribution of confidential information to an employee of a competitor could be inadvertent or intentional. For example, an employee may want to forward the electronic mail message itemizing the new features to several members of the company's marketing team. When forwarding the electronic mail message, the employee may enter the partial names of the intended recipients. However, if an intended recipient has a name similar to an employee of a competitor, the electronic mail program may resolve the partial name to the electronic mail address of the competitor's employee. Even though a disclosure may be inadvertent, the company can, nevertheless, be seriously harmed. It may be even more problematic when an employee intentionally forwards the electronic mail message with the confidential information to someone who is unauthorized to receive such information. In such a case, the employee may try to mask the confidential nature of the information by, for example, removing notifications of confidentiality (e.g., "This document contains confidential, proprietary, and trade secret information of The Acme Company.") from the electronic mail message. Moreover, unauthorized disclosure of confidential information is not limited to electronic mail messages; unauthorized disclosures can take other forms of electronic communications. For example, employees can disclose confidential information via Internet news and discussion groups, instant messaging systems, attachments to electronic mail messages, press releases, electronic presentations, published articles, and so on.

Some electronic mail systems have features that allow for the filtering of electronic mail messages to ensure that they do not contain inappropriate content. For example, such a system may scan outgoing messages for indications of confidential information such as the words "proprietary," "confidential," or "trade secret." If such words are found in a message, then the system may prohibit the sending of the message. However, not all electronic mail messages that contain confidential information have such words. For example, employees on a design team may frequently send electronic mail messages to one another to get informal feedback on new ideas. In such cases, the electronic mail messages would not typically contain notices of confidentiality. In addition, an employee who intentionally wants to send confidential information to a competitor can easily avoid detection by such systems by removing such words from the message before forwarding it.

It would be desirable to have a system that would be able to reliably detect the presence of confidential information in electronic mail messages and more generally in any outgoing communication (e.g., publication, news group posting, and electronic mail attachments). In the case of an electronic mail message, such a system should be able to detect when an employee simply forwards an original electronic mail message without any modification, when the employee cuts and pastes portions of the original electronic mail message into a new electronic mail message, when the employee forwards portions of the original electronic mail message with additional comments, when the employee modifies the content of the original electronic mail message, and so on. Moreover, because of the volume of electronic mail messages that an organization may generate, it would be desirable that such a system would be able to rapidly detect such confidential information in electronic mail messages without significantly delaying delivery and without having to make significant investment in additional hardware and software to support such detection.

SUMMARY

A computer-based method and system for identifying whether a communication contains content similar to content of target documents is provided. The system identifies candidate documents as those target documents that contain keywords similar to the keywords of the communication. The system then compares the candidate documents to the communication to determine whether the communication contains content similar to a candidate document. When the communication is an outgoing communication, such as an electronic mail message that contains content similar to the candidate documents, the system may suppress the delivery of the outgoing communication.

DETAILED DESCRIPTION

Figure 1:
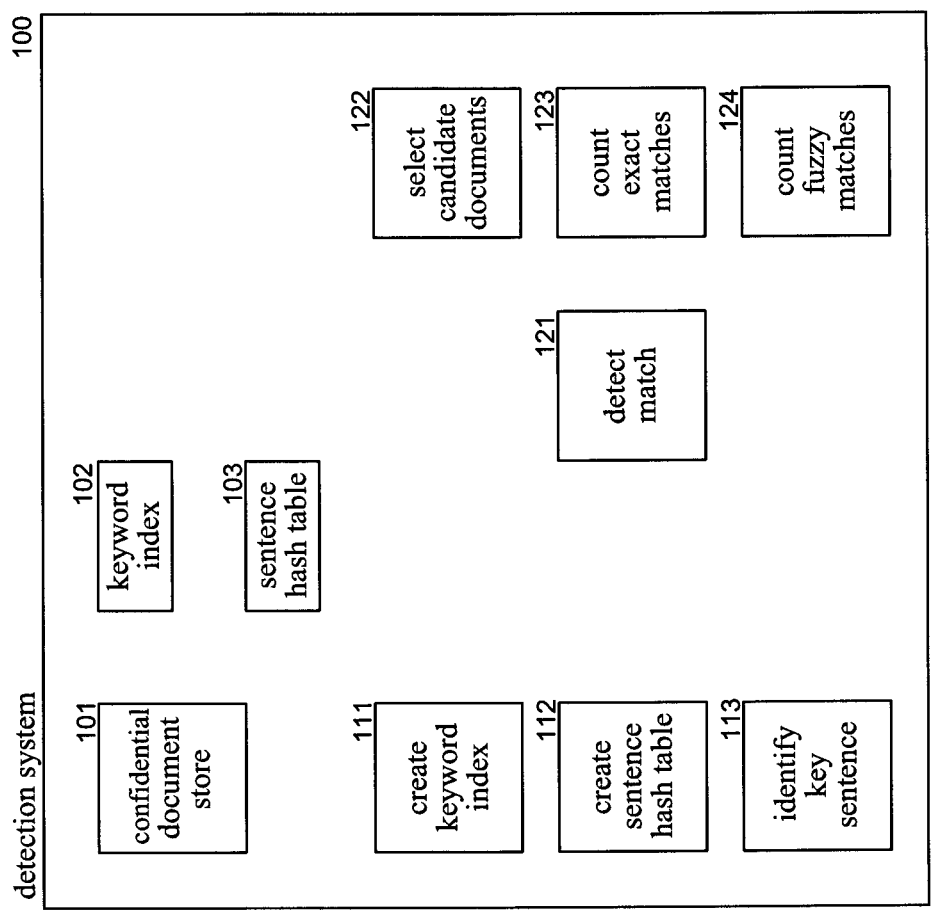
FIG. 1 is a block diagram illustrating components of a detection system in one embodiment.

A method and system for detecting whether an outgoing communication contains confidential information or other target information is provided. In one embodiment, the detection system is provided with a collection of documents that contain confidential information, referred to as "confidential documents." For example, when the outgoing communication is an electronic mail message, then the confidential documents may be previously sent electronic mail messages that contain confidential information. When the detection system is provided with the outgoing communication, it compares content of the outgoing communication to content of the confidential documents. If the comparison indicates that the outgoing communication contains confidential information, then the detection system may prevent the outgoing communication from being sent outside the organization. For example, the detection system may be implemented as part of an electronic mail gateway between internal electronic mail users of an organization and external electronic mail users. In this way, the detection system detects confidential information based on the similarity between the content of an outgoing communication and the content of confidential documents that are known to contain confidential information and does not need to rely on notices of confidentiality that can be easily removed.

Since the employees of an organization may send hundreds of thousands of electronic mail messages outside the organization on a daily basis, and the organization may have thousands of confidential documents, it may be impractical to simply compare each sentence of each outgoing communication to each sentence of each confidential document. Indeed, the computational complexity of the comparisons may be of the O(N×M), where N is the number of confidential documents and M is the number of outgoing communications. In one embodiment, the detection system organizes the confidential documents using various auxiliary data structures to ensure that confidential information in an outgoing communication can be quickly identified. The detection system may generate an index that maps keywords of the confidential documents to those confidential documents that contain the keywords. For example, several confidential documents may contain the phrase "new product release." In such a case, the keywords "new," "product," and "release" may be mapped to each of those confidential documents. When the detection system receives an outgoing communication, it identifies the keywords of the outgoing communication. The detection system can then use the keyword index to identify which confidential documents contain similar keywords. For example, the detection system may select those confidential documents that have a significant number of keywords in common with the outgoing communication. The detection system can then compare the content of the outgoing communication to the identified confidential documents, also referred to as "candidate documents," to determine whether the outgoing communication actually contains confidential information. For example, if the outgoing communication contains the keywords "new," "product," and "release," but each keyword is used in a different sentence, the detection system may identify several confidential documents that contain the phrase "new product release." However, when the detection system compares the content of the outgoing communication to the actual content of the candidate documents, it will not detect a similarity and will thus allow the outgoing communication to be sent. The detection system may use various techniques for identifying keywords within a document. For example, the detection system may use a term frequency by inverse document frequency metric (i.e., "TF*IDF") to identify keywords. One skilled in the art will appreciate that other metrics may be used. For example, the detection system may factor in the emphasis (e.g., font size, font weight, and underlining) given a word in a document, the metadata of a document (e.g., keyword attributes, abstract attribute, and title attribute), and so on. By using the keyword index, the detection system can efficiently narrow the confidential documents to a set of candidate documents for further comparison.

In one embodiment, the detection system uses an auxiliary data structure, such as a hash table, to help identify which candidate documents are similar to an outgoing communication. The detection system may generate a sentence hash table that maps a hash code derived for each sentence to the confidential documents that contain those sentences. The detection system generates the sentence hash table by applying a hash function to each sentence of the confidential documents to generate a hash code for each sentence. The detection system then stores a mapping of the hash codes to the corresponding sentences within the confidential documents. After the detection system identifies candidate documents for an outgoing communication, the detection system generates hash codes for the sentences of the outgoing communication. The detection system uses the generated hash codes to identify which candidate documents contain sentences with the same hash codes. The detection system may then compare the identified sentences with the corresponding sentence of the outgoing communication to determine whether they match (i.e., exactly match or are similar). Depending on the extent of the match (e.g., the number of times the sentences of the outgoing communication match sentences of the confidential documents), the detection system may flag the outgoing communication as containing confidential information. To speed up the process of outgoing communications, the detection system may analyze only "key sentences" of the confidential documents and the outgoing communications. A key sentence, for example, may correspond to the topic sentence of a paragraph.

In one embodiment, the detection system may use another auxiliary data structure, such as a keyword-sentence index, to help identify which candidate documents are similar to an outgoing communication. The detection system may generate a keyword-sentence index that maps keywords of confidential documents to sentences within those confidential documents that contain those keywords. After the detection system identifies candidate documents, the detection system may use the keyword-sentence index to calculate the similarity between each sentence of the outgoing communication and each sentence of the candidate documents. The detection system may use any of various similarity metrics, such as cosine similarity and edit distance. Based on the extent of the similarity (e.g., number of sentences of the confidential documents that are similar to the sentences of the outgoing communication), the detection system flags the outgoing communication as containing confidential information.

In one embodiment, the detection system bases its analysis on "key sentences" of the confidential documents and outgoing communications, rather than performing its analysis on every sentence. A "key sentence" is a sentence that represents the key idea of a confidential document or a paragraph within a confidential document. The detection system may identify the key sentences of a document in various ways. The detection system may calculate the similarity of each sentence of a paragraph to the paragraph. The sentence with the highest similarity to the paragraph may be considered the key sentence of the paragraph that is representative of the confidential information of the paragraph and is therefore the most important sentence of the paragraph. To calculate the similarity, the detection system may represent the paragraph and each sentence by its keywords. The detection system then calculates the similarity between the keywords of each sentence to the keywords of the paragraph. The detection system selects the sentence with the highest similarity as a key sentence. Alternatively, the detection system may identify key sentences using a term frequency by inverse sentence frequency metric (i.e., TF*ISF) to calculate the importance of the sentences to the paragraph. The inverse sentence frequency, like the inverse document frequency, reflects the number of sentences in the document divided by the number of sentences that contain that word. The detection system calculates the importance of a word to a sentence by multiplying the number of occurrences of that word within the sentence by inverse sentence frequency of the sentence. The detection system may then set the importance of each sentence to the average of the importances of the words within the sentence. The detection system selects the sentences with the highest importances as the key sentences. One skilled in the art will appreciate that the key sentences can be derived from the overall importance or similarity of a sentence to the document, rather than on a paragraph-by-paragraph basis.

In one embodiment, the detection system may add documents to the collection of confidential documents in various ways. The detection system may provide a user interface through which an administrator can submit confidential documents to the collection. In addition, the detection system may have a subsystem that can analyze a corpus of documents and detect which documents have a notice of confidentiality. For example, an indication may be the word "confidential" in the footer or header of the document.

One skilled in the art will appreciate that the detection system can be used to detect similar content in a variety of environments other than to detect confidential information sent via an electronic mail system. The detection system may be used to detect similar content in any type of incoming and outgoing communication, such as news and discussion group postings, instant messages, electronic mail attachments, press releases, electronic presentations, published articles, messages distributed by a voice communications systems, web pages, and so on. In the case of a posting to a web-based discussion group, the detection system may be integrated with a web browser. The detection system may also be implemented to decrypt and encrypt content of communications as appropriate. The detection system can also be used to identify any type of target information and is not limited to the confidential information of electronic mail messages. The target information could be used to monitor what type of electronic mail messages employees are sending. For example, the target information can be a collection of template electronic mail messages that represent typical messages sent by employees, such as scheduling messages, personal messages, problem reporting messages, help messages, and so on. The detection system can be used to detect whether an accessed web page contains undesirable content.

FIG. 1 is a block diagram illustrating components of a detection system in one embodiment. The detection system 100 includes document store data structures 101-103, initialize data structure components 111-113, and detection components 121-124. The document store data structures include a confidential document store 101, a keyword index 102, and a sentence hash table 103. The detection system may process the confidential documents before placing them in the confidential document store. For example, in the case of electronic mail messages, the detection system may strip out the From:, To:, and Subject: information and strip out the greeting and closing portion of the content. The detection system may also normalize the remaining content in various ways such as removing capitalization, adjusting non-alphanumeric characters within words (e.g., "n*w d*sign"), and make other adjustments to counteract the sender's attempt to obscure confidential information. The keyword index maps the keywords of the confidential documents to the confidential documents that contain those keywords. In one embodiment, the keyword index may also identify the sentences within each confidential document that contain the keyword. Alternatively, the document store data structures may also include a keyword/key sentence index that maps keywords to the key sentences of the confidential documents that contain those keywords. The sentence hash table maps hash codes of sentences (e.g., key sentences) to the confidential documents that contain those sentences. The initialize data structure components include a create keyword index component 111, a create sentence hash table component 112, and an identify key sentence component 113. The create keyword index component creates the keyword index for the documents of the confidential document store. The create keyword index component may identify keywords based on a term frequency by inverse document frequency metric. The create sentence hash table component initializes the sentence hash table to map hash codes for key sentences to sentences within confidential documents. The create sentence hash table component invokes of the identify key sentence component to identify key sentences. The detection components include a detect match component 121 that invokes a select candidate documents component 122, a count exact matches component 123, and a count fuzzy matches component 124. The detect match component first invokes the select candidate documents component to identify candidate documents that may be similar to an outgoing communication. The detect match component then invokes the count exact matches component to determine whether sentences of the candidate documents match sentences of the outgoing communication. If so, then depending on the extent of the matches, the find match component indicates that the outgoing communication contains confidential information. If the extent of the exact matches is not sufficient to indicate confidential information, the detect match component may invoke the count fuzzy matches component to identify whether sentences of the outgoing communication are similar (e.g., a fuzzy match, rather than an exact match) to sentences of the candidate documents. If so, then depending on the extent of the similarity, the detect matches component indicates that the outgoing communication contains confidential information. One skilled in the art will appreciate that various combinations of the detect match components can be used in an implementation of the detection system. For example, the detection system may use the select candidate documents component and the count fuzzy matches component but not the count exact matches component. The detection system may also provide a rating of the extent of the match (e.g., extremely likely, highly likely, likely, and unlikely) so that the appropriate action can be taken (e.g., notify security personnel and suppress the sending of the outgoing communication). One skilled in the art will appreciate that an outgoing communication may correspond to any communication sent outside a defined set of recipients. The detection system may also segregate the target information into different levels of concern (e.g., extremely confidential, highly confidential, and confidential). The detection system may define different sets of recipients who are authorized to receive communications with different levels of concern.

The computing device on which the detection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the detection system. In addition, the data structures and message structures may be stored or transmitted via a data transmission medium, such as a signal on a communications link. Various communications links may be used, such as the Internet, a local area network, a wide area network, or a point-to-point dial-up connection.

The detection system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
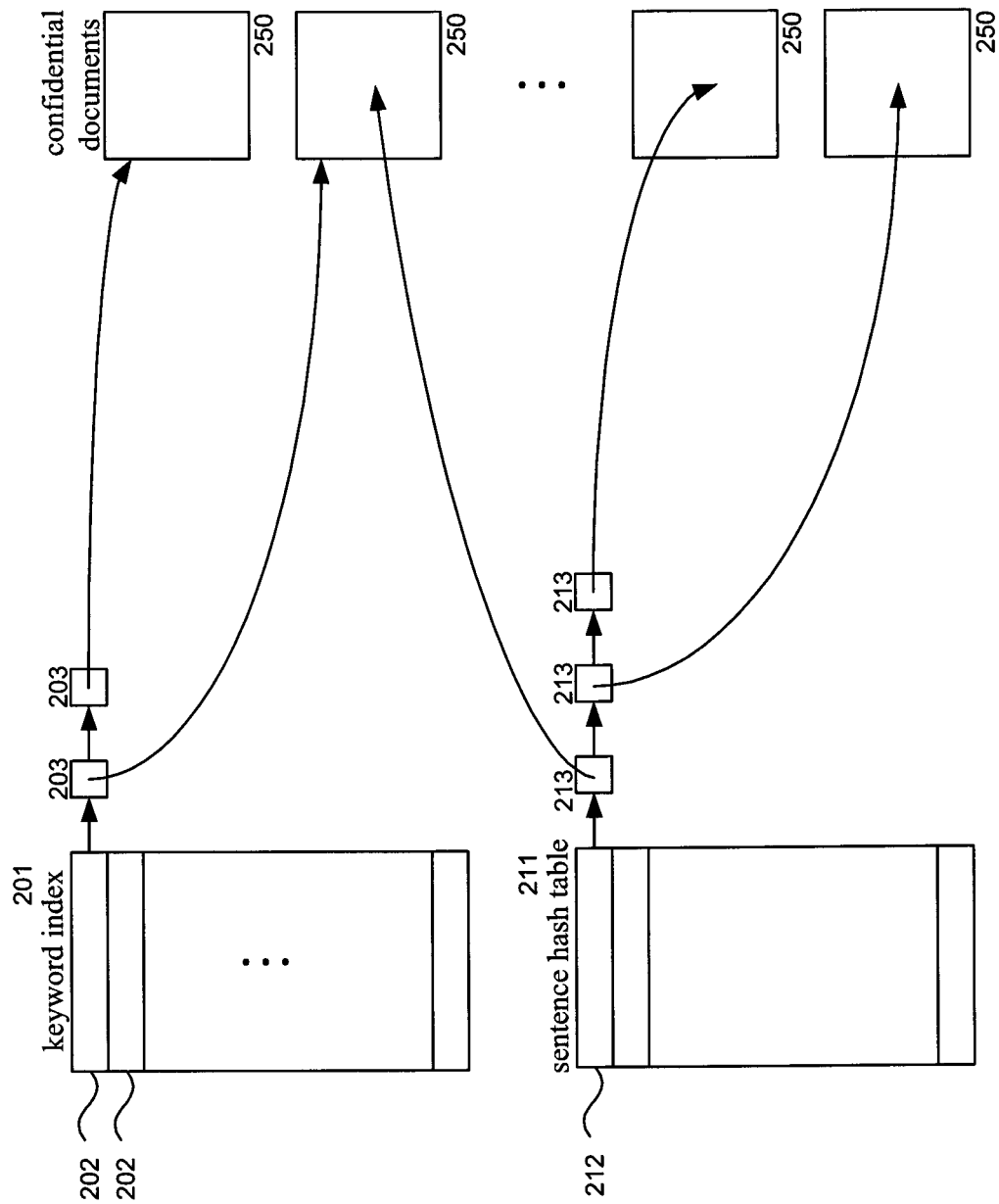
FIG. 2 is a block diagram that illustrates the data structures of the detection system of FIG. 1 in one embodiment.

FIG. 2 is a block diagram that illustrates the data structures of the detection system of FIG. 1 in one embodiment. The keyword index 201 and the sentence hash table 211 map keywords and sentences to the confidential documents 250 of the confidential document store (i.e., target information store). The keyword index contains an entry 202 for each keyword of the confidential documents. Each entry contains a sub-entry 203 for each document that contains that keyword. In one embodiment, the keyword index may also include an auxiliary data structure that maps keywords to key sentences of the confidential documents that contain those keywords. The sentence hash table contains an entry 212 for each sentence hash code. Each entry may contain sub-entries 213 that map to the particular sentences within documents corresponding to that sentence hash code. For example, if two confidential documents contain the same key sentence, then the sentence hash code for those two sentences would be the same. In addition, the hash function may map two different sentences to the same hash code. Thus, the sub-entries represent a chain of colliding hash codes. One skilled in the art will appreciate that the keyword index and the sentence hash table may be implemented using various data structure techniques, such as arrays, binary trees, linked lists, and hash tables, and that the data structures shown represent one possible logical organization of the data of the detection system.

Figure 3:
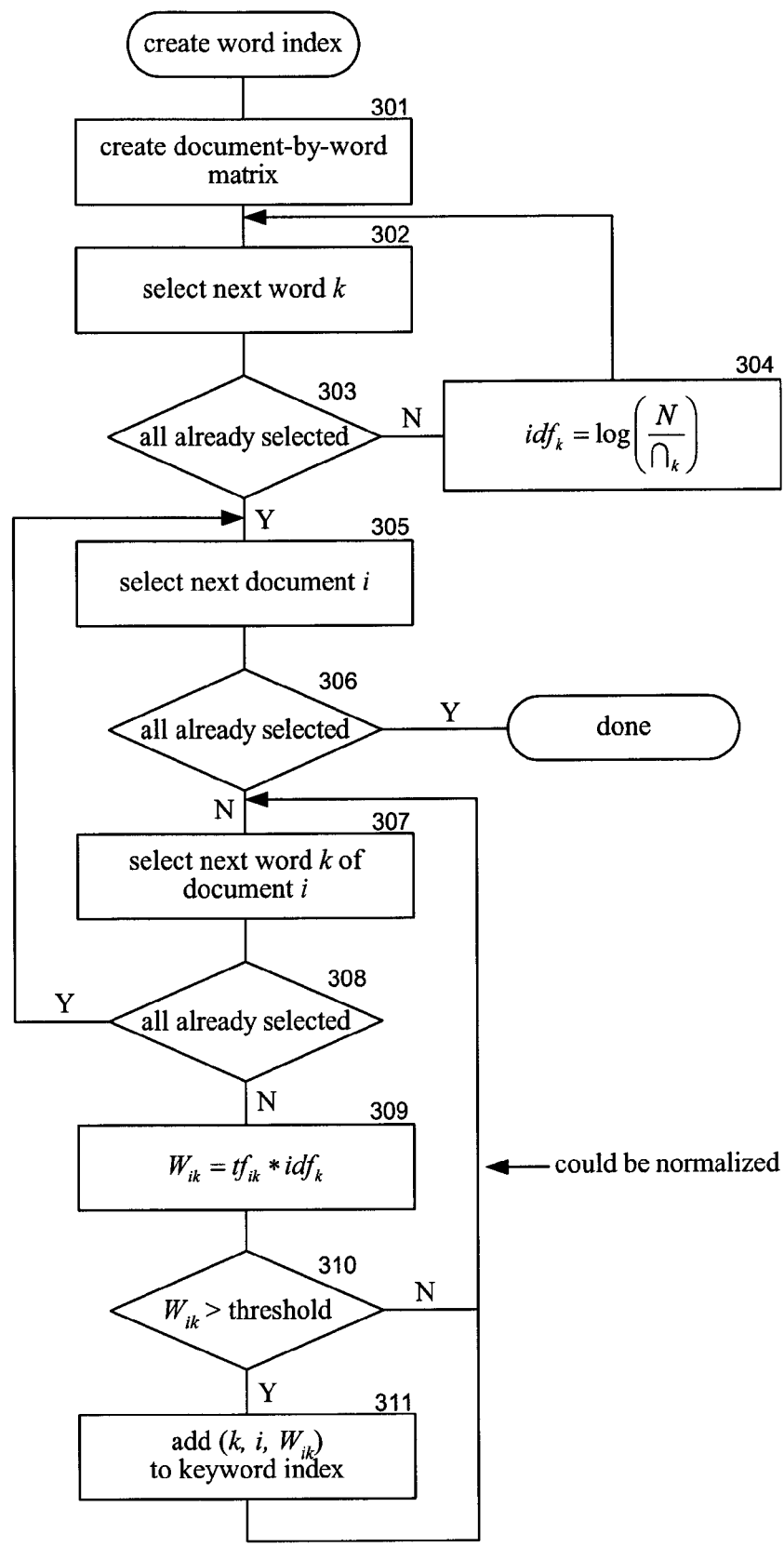
FIG. 3 is a flow diagram that illustrates the processing of the create keyword index in one embodiment.

FIG. 3 is a flow diagram that illustrates the processing of the create keyword index in one embodiment. The component generates an inverse document frequency metric for each word of the confidential documents and then calculates the importance of each word to its document using a term frequency by inverse document frequency metric. The component then selects the most important words of each document as keywords of that document and adds a corresponding entry for each keyword to the keyword index. In block 301, the component creates a document-by-word matrix that indicates the number of each word in each document. The component derives the inverse document frequency and term frequency from this matrix. In blocks 302-304, the component loops, calculating the inverse document frequency for each word within the confidential documents. The component may disregard stop words (e.g., "and," "the," and "a") in the documents. In block 302, the component selects the next word of the confidential documents. In decision block 303, if all the words of the confidential documents have already been selected, then the component continues at block 305, else the component continues at block 304. In block 304, the component calculates the inverse document frequency for the selected word as the log of the number of confidential documents divided by the number of confidential documents that contain the selected word. The component then loops to block 302 to select the next word of the confidential documents. In blocks 305-311, the component loops, selecting each document and calculating the importance of each word within that document to the document. In block 305, the component selects the next confidential document. In decision block 306, if all the confidential documents have already been selected, then the component completes, else the component continues at block 307. In block 307, the component selects the next word of the selected confidential document. In decision block 308, if all the words of the selected confidential document have already been selected, then the component loops to block 305 to select the next confidential document, else the component continues at block 309. In block 309, the component calculates the importance of the selected word to the selected confidential document as the product of the term frequency (i.e., the number of occurrences of the selected word within the selected confidential document) times the inverse document frequency for the selected word. One skilled in the art will appreciate that the importance of a word to a document can be calculated in many different ways. For example, the term frequency by inverse document frequency metric may be normalized to account for the total number of words within a document. In decision block 310, if the importance is greater than a threshold importance, then the component continues at block 311, else the component continues at block 307 to select the next word of the selected document. In block 311, the component adds an entry to the keyword index that maps the selected word to the selected document. The entry may also contain the calculated importance for use when determining whether a sentence of a confidential document is similar to a sentence of an outgoing communication. The component then loops to block 307 to select the next keyword of the selected confidential document.

Figure 4:
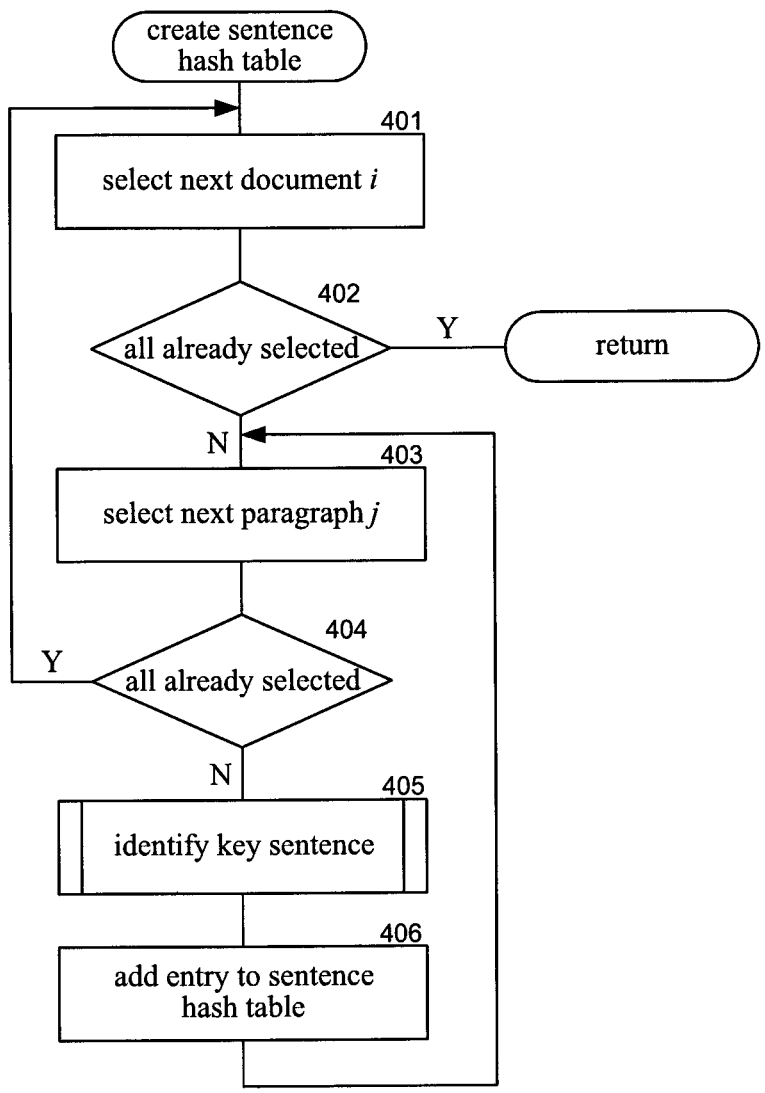
FIG. 4 is a flow diagram that illustrates the processing of the create sentence hash table component in one embodiment.

FIG. 4 is a flow diagram that illustrates the processing of the create sentence hash table component in one embodiment. The component adds an entry to the sentence hash table for each key sentence of the confidential documents. In block 401, the component selects the next confidential document. In decision block 402, if all the confidential documents have already been selected, then the component returns, else the component continues at block 403. In block 403, the component selects the next paragraph of the selected document. In decision block 404, if all the paragraphs of the selected document have already been selected, then the component loops to block 401 to select the next confidential document, else the component continues at block 405. In block 405, the component invokes the identify key sentence component passing the selected paragraph. The invoked component returns an indication of the key sentence(s) of the passed paragraph. In block 406, the component invokes a hash function to generate a hash code for the key sentence and then adds an entry to the sentence hash table for the identified key sentence. One skilled in the art will appreciate that various hashing functions can be used. For example, a hash function could generate a hash code from the first letter of each key word of a sentence. The component then loops to block 403 to select the next paragraph of the selected document. One skilled in the art will appreciate that the key sentences can be derived based on their similarity to the entitled document, rather than on a paragraph-by-paragraph basis.

Figure 5:
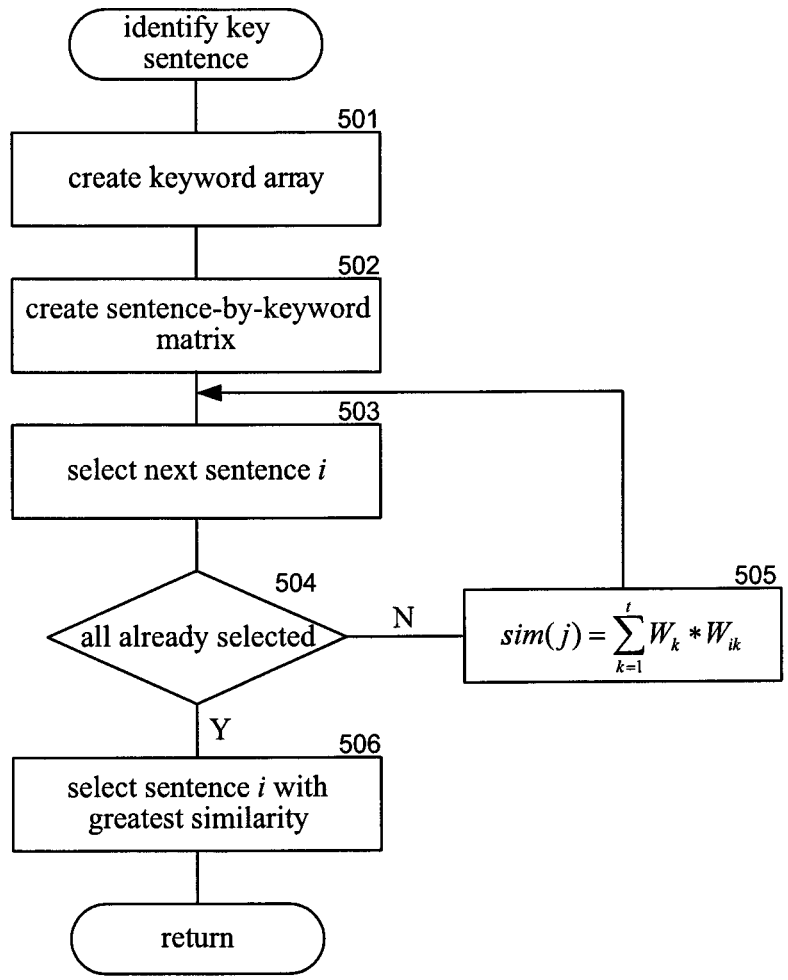
FIG. 5 is a flow diagram that illustrates the processing of the identify key sentence component based on the similarity of the keywords of the sentences to the keywords of a paragraph in one embodiment.

FIG. 5 is a flow diagram that illustrates the processing of the identify key sentence component based on the similarity of the keywords of the sentences to the keywords of a paragraph in one embodiment. The component calculates the similarity between the keywords of each sentence and the keywords of the paragraph. The component then selects the sentence whose keywords are most similar to the keywords of the paragraph as the key sentence of the paragraph. In block 501, the component creates a keyword array that lists the number of occurrences of each keyword within the paragraph. In block 502, the component creates a sentence-by-keyword matrix that indicates the number of occurrences of each keyword within each sentence of the paragraph. In blocks 503-505, the component loops, calculating the similarity of each sentence to the paragraph. In block 503, the component selects the next sentence of the paragraph. In decision block 504, if all the sentences have already been selected, then the component continues at block 506, else the component continues at block 505. In block 505, the component calculates the similarity of the selected sentence to the paragraph. In one embodiment, the component may calculate the similarity as the sum of the product of the importances of the keywords that are common between the selected sentence and the paragraph as indicated by the matrix and array. The component then loops to block 503 to select the next sentence of the paragraph. In block 506, the component selects the sentence with the greatest similarity to the paragraph. The component then returns. In one embodiment, the component may identify multiple key sentences of a paragraph. After the first key sentence is identified, the component may remove the keywords of that key sentence from the keywords of the paragraph, repeat the calculation of the similarity for the remaining sentences, and then select the sentence with the highest of those similarities as another key sentence. The component may repeat this process until a desired number of key sentences are identified.

Figure 6:
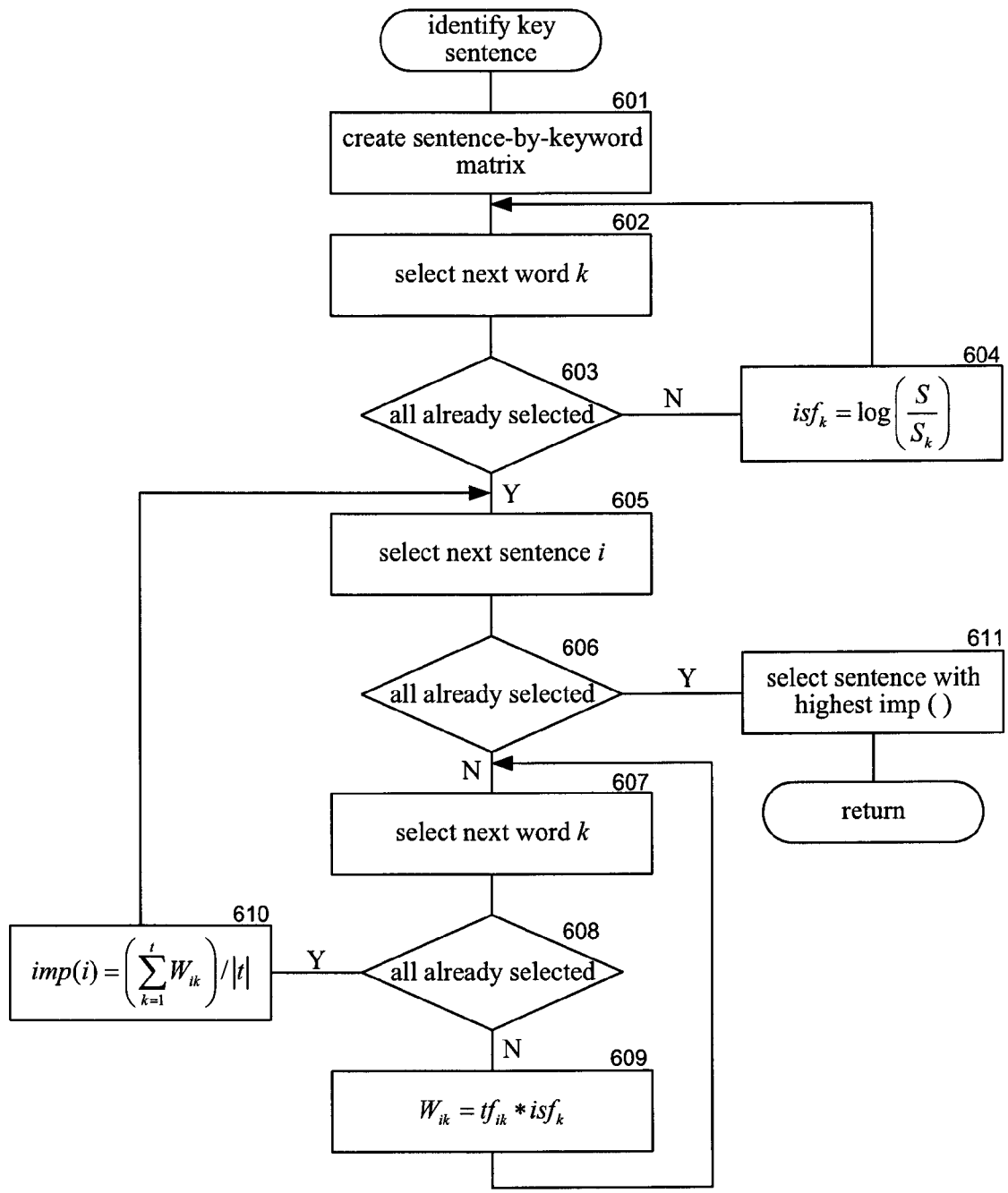
FIG. 6 is a flow diagram that illustrates the processing of the identify key sentence component based on inverse sentence frequency in one embodiment.

FIG. 6 is a flow diagram that illustrates the processing of the identify key sentence component based on inverse sentence frequency in one embodiment. FIGS. 5 and 6 thus represent alternative ways to identify key sentences. One skilled in the art will appreciate that either way or a combination of ways could be used to identify key sentences. The component calculates the inverse sentence frequency for each keyword. The component then calculates an importance, such as a term frequency by inverse sentence frequency metric, for each word of each sentence. The component then calculates the importance of a sentence by summing the importances of the keywords of the sentence. The sentence with the highest importance is considered the key sentence of the paragraph. In block 601, the component creates a sentence-by-keyword matrix. In blocks 602-604, the component loops, selecting keywords of the paragraph and calculating their inverse sentence frequency. In block 602, the component selects the next keyword of the paragraph. In decision block 603, if all the keywords of the paragraph have already been selected, then the component continues at block 605, else the component continues at block 604. In block 604, the component calculates the inverse sentence frequency for the selected keyword as the log of the number of sentences within the paragraph divided by the number of sentences within the paragraph that contain the selected keyword. In blocks 605-610, the component loops, calculating the importance of each sentence to the paragraph. In block 605, the component selects the next sentence of the paragraph. In decision block 606, if all the sentences have already been selected, then the component continues at block 611, else the component continues at block 607. In block 607, the component selects the next keyword of the selected sentence. In decision block 608, if all the keywords of the selected sentence have already been selected, then the component continues at block 610, else the component continues at block 609. In block 609, the component calculates the importance of the selected keyword to the selected sentence as the number of occurrences of the keyword within the sentence times the inverse sentence frequency of the sentence. The component then loops to block 607 to select the next keyword of the selected sentence. In block 610, the component calculates the importance of the selected sentence to the paragraph by summing the importance of the keywords of the selected sentence divided by the number of keywords in the selected sentence (i.e., average keyword importance). The component then loops to block 605 to select the next sentence. In block 611, the component selects the sentence with the highest importance as the key sentence and then returns.

Figure 7:
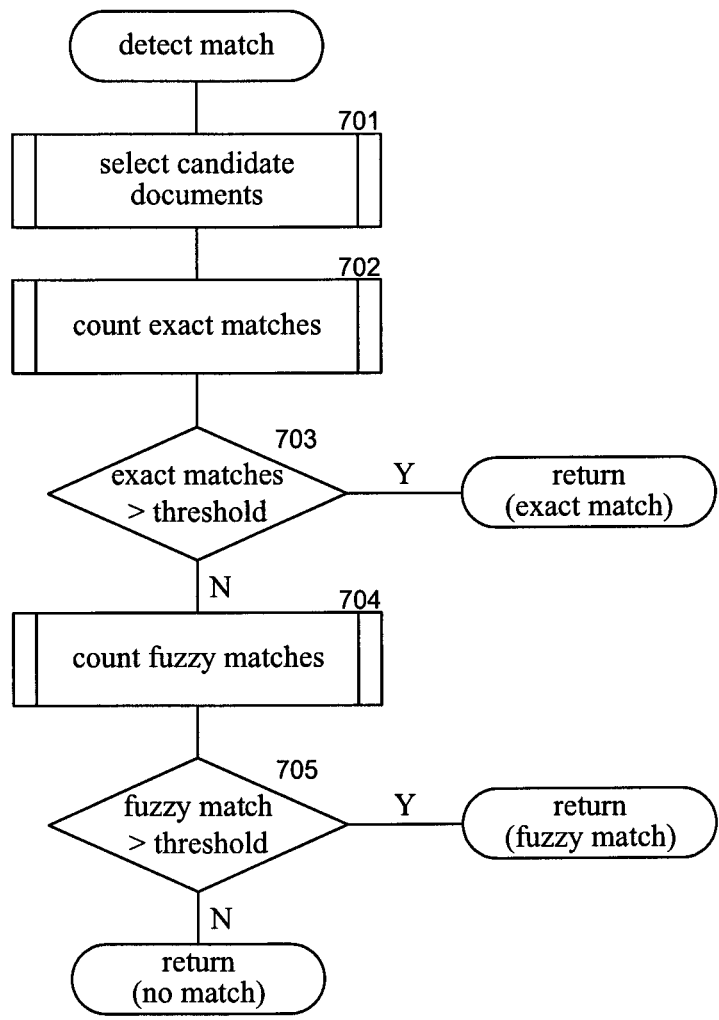
FIG. 7 is a flow diagram illustrating the processing of the detect match component in one embodiment.

FIG. 7 is a flow diagram that illustrates the processing of the detect match component in one embodiment. In block 701, the component invokes the select candidate documents component to identify the candidate documents for a match. In block 702, the component invokes the count exact matches component to identify the extent of exact matches between sentences of the outgoing communication and sentences of the confidential documents. In decision block 703, if the extent of exact matches exceeds a threshold, then the component returns an indication that an exact match has been detected, else the component continues at block 704. In block 704, the component invokes the count fuzzy matches component to identify the extent of fuzzy matches between the sentences of the confidential documents and the sentences of the outgoing communication. In decision block 705, if the extent of fuzzy matches exceeds a threshold, then the component returns an indication that a fuzzy match has been found, else the component returns an indication that no match has found.

Figure 8:
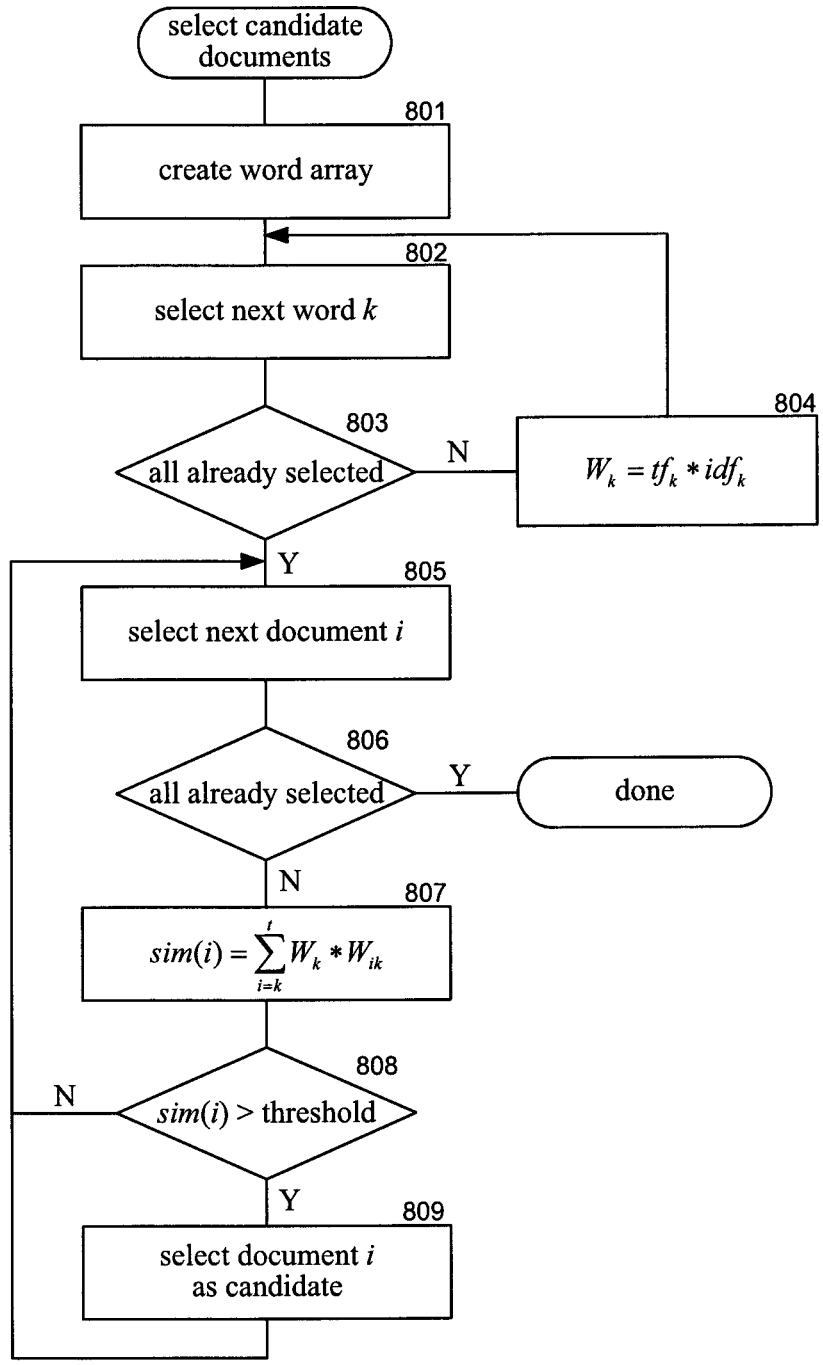
FIG. 8 is a flow diagram illustrating the processing of the select candidate documents component in one embodiment.

FIG. 8 is a flow diagram illustrating the processing of the select candidate documents component in one embodiment. The component identifies the keywords of the outgoing communication and then identifies documents with similar keywords as candidate documents. In block 801, the component creates a word array of the words of the outgoing communication. In blocks 802-804, the component loops, calculating the importance of the words of the outgoing communication. In block 802, the component selects the next word of the outgoing communication. In decision block 803, if all the words of the outgoing communication have already been selected, then the component continues at block 805, else the component continues at block 804. In block 804, the component calculates the importance of the selected word using a term frequency by inverse document frequency metric and loops to block 802 to select the next word. The inverse document frequency may represent inverse document frequency within the confidential documents. In blocks 805-809, the component loops, selecting each confidential document and calculating its similarity to the outgoing communication. In block 805, the component selects the next confidential document. In decision block 806, if all the confidential documents have already been selected, then the component completes, else the component continues at block 807. In block 807, the component calculates the similarity of the selected confidential document to the outgoing communication by summing the product of the importances of the keywords that are common between the confidential documents and the outgoing communication. In decision block 808, if the similarity exceeds a threshold similarity, then the component continues at block 809, else the component loops to block 805 to select the next confidential document. In block 809, the component selects the selected document as a candidate document and then loops to block 805 to select the next confidential document.

Figure 9:
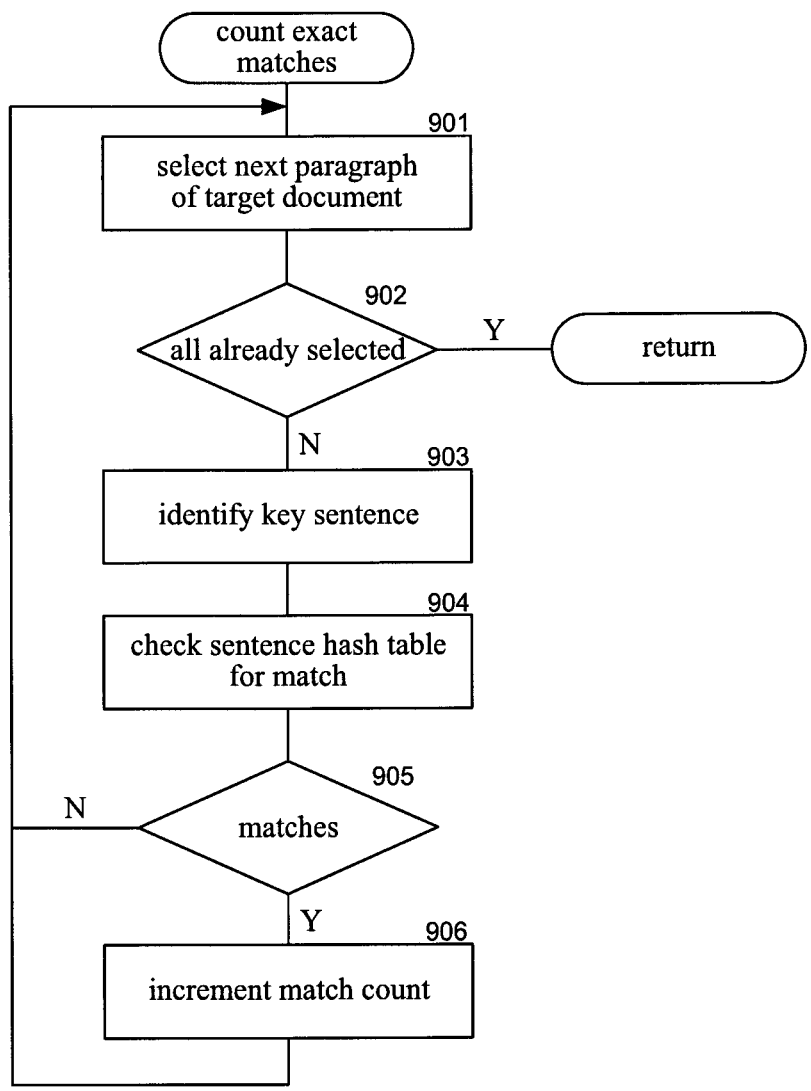
FIG. 9 is a flow diagram that illustrates the processing of the count exact matches component in one embodiment.

FIG. 9 is a flow diagram that illustrates the processing of the count exact matches component in one embodiment. The component counts the number of times that a sentence of the outgoing communication matches a sentence within the candidate documents. In block 901, the component selects the next paragraph of the outgoing communication. In decision block 902, if all the paragraphs have already been selected, then the component returns, else the component continues at block 903. In block 903, the component invokes an identify key sentence component to identify the key sentence of the selected paragraph. In block 904, the component invokes a hash function to generate a hash code for the key sentence. The component then checks each sub-entry of the hashed-to entry of the sentence hash table to determine whether the key sentence matches sentences of candidate documents. The component may perform a word-by-word check with each hashed-to sentence. In decision block 905, if a match was found, then the component continues at block 906, else the component loops to block 901 to select the next paragraph of the outgoing communication. In block 906, the component increments a match count for the outgoing communication by the number of found matches. The component then loops to block 901 to select the next paragraph of the outgoing communication.

Figure 10:
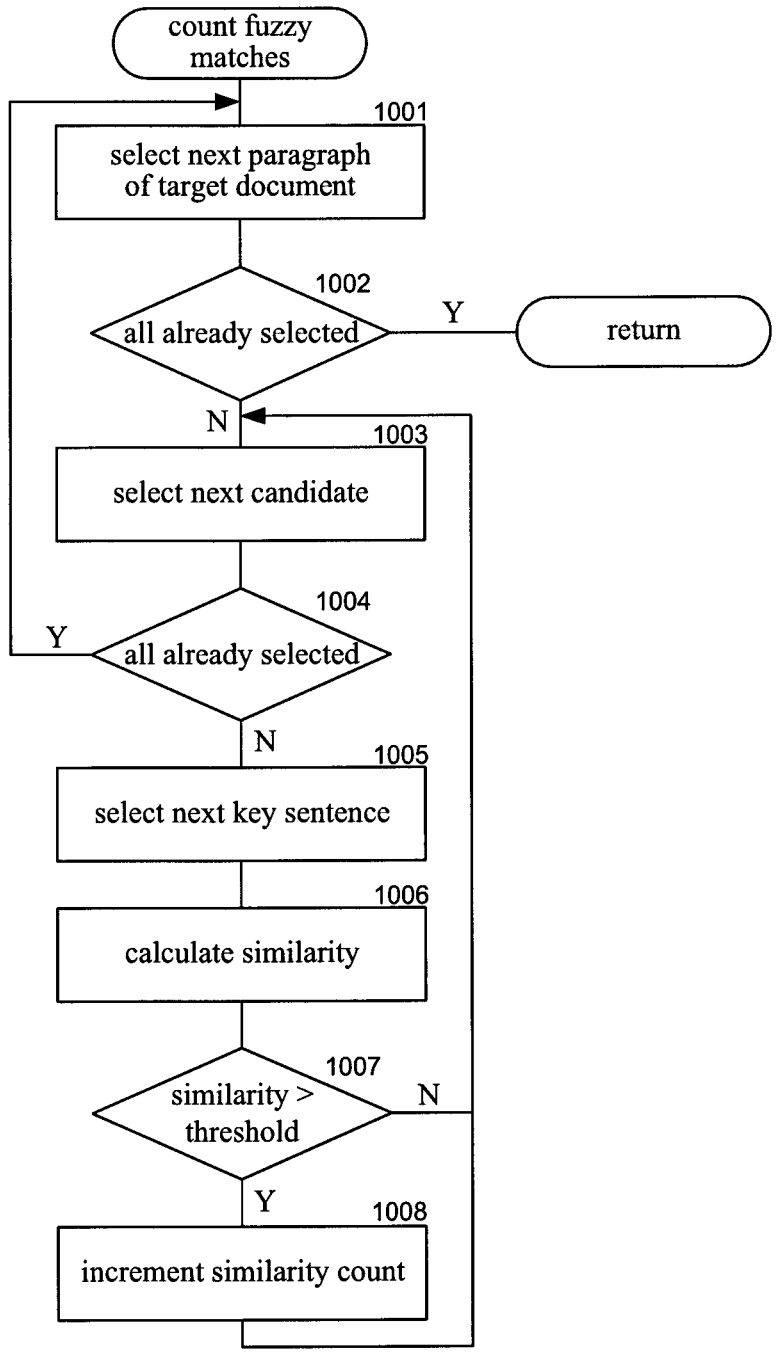
FIG. 10 is a flow diagram that illustrates the processing of the count fuzzy matches component in one embodiment.

FIG. 10 is a flow diagram that illustrates the processing of the count fuzzy matches component in one embodiment. In block 1001, the component selects the next paragraph of the outgoing communication. In decision block 1002, if all the paragraphs have already been selected, then the component returns, else the component continues at block 1003. In block 1003, the component selects the next candidate document. In decision block 1004, if all the candidate documents have already been selected, then the component loops to block 1001 to select the next paragraph of the outgoing communication, else the component continues at block 1005. In block 1005, the component selects the next key sentence of the selected candidate document. In block 1006, the component calculates the cosine similarity or the edit distance between the selected sentences. In decision block 1007, if the similarity or distance exceeds a threshold, then the component continues at block 1008, else the component loops to block 1003 to select the next candidate document. In block 1008, the component increments the similarity count for the outgoing communication and then loops to block 1003 to select the next candidate document.

One skilled in the art will appreciate that although specific embodiments of the detection system have been described herein for purposes of illustration, various modifications may be made without deviating from the spirit and scope of the invention. Accordingly, the invention is not limited except by the appended claims.

We claim:

1. A method in a computer system having a memory and a processor for identifying whether an outgoing communication contains target information, the method comprising:
    providing documents that contain target information;
    for each of at least some words in the provided documents, with the processor, determining an importance value for the word,
        in response to determining that the importance value determined for the
    word exceeds a threshold, designating the word as a keyword, and
        in response to determining that the importance value determined for the
    word does not exceed the threshold, not designating the word as a keyword;
    generating a keyword index that maps keywords to documents that contain the keywords;
    receiving an outgoing communication;
    using the keyword index to locate candidate documents from among the provided documents based on keywords of the received outgoing communication; and
    with the processor, comparing the received outgoing communication to at least a portion of the located candidate documents to determine whether the received outgoing communication contains target information.

2. The method of claim 1, further comprising:
    upon determining that the received outgoing communication contains target information, suppressing the delivery of the received outgoing communication to its intended recipient.

3. The method of claim 1 wherein words are identified as being keywords based on a term frequency by inverted document frequency metric.

4. The method of claim 1 wherein the outgoing communication is an electronic mail message.

5. The method of claim 1 wherein the outgoing communication is an attachment to an electronic mail message.

6. The method of claim 1 wherein the outgoing communication is a voice communication.

7. The method of claim 1 wherein the outgoing communication is an Internet posting.

8. The method of claim 1 wherein the threshold is determined prior to determining the importance values.

9. A method in a computer system having a memory and a processor for identifying whether an outgoing communication contains target information, the method comprising:
providing documents that contain target information;
for each of at least some words in the provided documents,
with the processor, determining an importance value for the word,
in response to determining that the importance value determined for the word exceeds a threshold, designating the word as a keyword, and
in response to determining that the importance value determined for the word does not exceed the threshold, not designating the word as a keyword;
generating a sentence hash table that, for each of at least some sentences, maps a hash code derived from the sentence to documents that contain the sentence;
receiving an outgoing communication;
using the sentence hash table to locate documents of the provided documents that contain one or more sentences that match one or more sentences of the received outgoing communication; and
with the processor, comparing the received outgoing communication to at least a portion of the located documents to determine whether the received outgoing communication contains target information.

10. The method of claim 9 wherein the sentence hash table maps each of one or more of the provided documents to a key sentence of the document.

11. A method in a computer system having a memory and a processor for identifying whether an outgoing communication contains target information, the method comprising:
providing documents that contain target information;
for each of at least some words in the provided documents,
with the processor, determining an importance value for the word,
in response to determining that the importance value determined for the word exceeds a threshold, designating the word as a keyword, and
in response to determining that the importance value determined for the word does not exceed the threshold, not designating the word as a keyword;
generating a keyword index that, for each of at least some keywords, maps the keyword to sentences of the provided documents that contain the keyword;
receiving an outgoing communication;
using the keyword index to locate documents of the provided documents that contain one or more sentences containing at least one keyword of the received outgoing communication; and
with the processor, comparing the received outgoing communication to at least a portion of the located documents to determine whether the received outgoing communication contains target information.

12. The method of claim 11 wherein the received outgoing communication is determined to contain target information when at least one located sentence of the provided documents is similar to at least one sentence of the received outgoing communication.

13. A computer-readable storage device containing instructions for controlling a computer system to identify whether a first document contains content similar to content of target documents, by operations comprising:
for each of at least some words of the target documents,
with a processor, determining an importance value for the word,
comparing the determined importance value to a threshold, and
when the determined importance value exceeds the threshold, designating the word as a keyword;
creating a keyword index that, for each of at least some keywords of the target documents, maps the keyword to one or more target documents that contain the keyword;
identifying keywords of the first document;
using the created keyword index to locate candidate documents, from among the target documents, based on a similarity between keywords of the target documents and the identified keywords of the first document; and
comparing the located candidate documents to the first document to determine whether the first document contains content similar to at least one candidate document.

14. The computer-readable storage device of claim 13 wherein when the first document is an outgoing communication that contains target information, suppressing the sending of the outgoing communication.

15. A computer-readable storage device containing instructions for controlling a computer system to identify whether a first document contains content similar to content of target documents, by operations comprising:
for each of at least some words of the target documents,
with a processor, determining an importance value for the word,
comparing the determined importance value to a threshold, and
when the determined importance value exceeds the threshold,
designating the word as a keyword;
generating a sentence hash table that, for each of at least some sentences of the target documents, maps a hash code derived from the sentence to target documents that contain the sentence;
using the sentence hash table to locate candidate documents that contain sentences that match sentences of the first document; and
comparing the located candidate documents to the first document to determine whether the first document contains content similar to at least one candidate document,
wherein the sentence hash table is generated prior to identifying sentences of the first document.

16. A computer system having a memory and a processor for determining whether a first electronic mail message contains target information, comprising:
a document store containing target electronic mail messages that contain target information;
a component configured to, for each of at least some words in the target electronic mail messages,
determine an importance value for the word, and
when the importance value determined for the word exceeds a first threshold, designate the word as a keyword,
a component configured to, for each of at least some of the target electronic mail messages,
calculate a similarity value for the target electronic mail message based at least in part on common keywords between the target electronic mail message and the first electronic mail message,
compare the calculated similarity value to a second threshold, and
designate the target electronic mail message as a candidate electronic mail message if the comparison indicates that the calculated similarity value is greater than the second threshold; and
a component configured to compare the first electronic mail message to the designated candidate electronic messages to determine whether the first electronic mail message contains target information, wherein the determination of whether the first electronic mail message contains target information is based at least in part on the designated keywords, and wherein at least one of the components comprises computer-executable instructions stored in memory for execution by the processor.

17. The computer system of claim 16, further comprising: a component configured to, when it is determined that the first electronic mail message contains target information, suppress delivery of the first electronic mail message to an intended recipient.

18. The computer system of claim 16 wherein at least one of the target electronic mail messages is not designated as a candidate electronic mail message.

19. The computer system of claim 16 wherein the similarity value for at least one target electronic mail message is calculated based at least in part on the number of common keywords between the at least one target electronic mail message and the first electronic mail message.

20. A computer-readable storage device containing instructions for controlling a computer system to identify whether a first document contains content similar to content of target documents, by operations comprising:

for each of at least some words of the target documents,
    with a processor, determining an importance value for the word,
    comparing the determined importance value to a threshold, and
    when the determined importance value exceeds the threshold,
        designating the word as a keyword;
selecting from the target documents candidate documents based on a similarity between keywords of the target documents and keywords of the first document; and
comparing the candidate documents to the first document to determine whether the first document contains content similar to a candidate document at least in part by,
    for each candidate document,
        determining a number of exact matches between sentences of the first document and sentences of the candidate document, and
        in response to determining that the number of exact matches between sentences of the first document and sentences of the candidate document does not exceed an exact match threshold,
            determining a number of fuzzy matches between sentences of the first document and sentences of the candidate document.

\* \* \* \* \*